United States Patent
Kawasaki et al.

(10) Patent No.: US 7,330,868 B2
(45) Date of Patent: Feb. 12, 2008

(54) DATA INPUT APPARATUS AND METHOD

(75) Inventors: Katsuhiko Kawasaki, Kanagawa (JP);
Tsuyoshi Yagisawa, Kanagawa (JP);
Makoto Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 10/680,106

(22) Filed: Oct. 8, 2003

(65) Prior Publication Data

US 2004/0078416 A1 Apr. 22, 2004

(30) Foreign Application Priority Data

Oct. 22, 2002 (JP) .............................. 2002-307427

(51) Int. Cl.
*G06F 7/50* (2006.01)

(52) U.S. Cl. .................................................. 708/672
(58) Field of Classification Search ................. 708/672
See application file for complete search history.

(56) References Cited

U.S. PATENT DOCUMENTS

| | | | | | |
|---|---|---|---|---|---|
| 4,355,799 | A | * | 10/1982 | Bartizal, Jr. | 271/151 |
| 4,777,658 | A | * | 10/1988 | Wren | 455/260 |
| 5,014,340 | A | * | 5/1991 | Wren | 455/1 |
| 5,226,062 | A | * | 7/1993 | Fluharty | 375/286 |
| 5,559,762 | A | * | 9/1996 | Sakamoto | 368/74 |

FOREIGN PATENT DOCUMENTS

| | | |
|---|---|---|
| JP | 11-272378 | 10/1999 |
| JP | 2000-207599 | 7/2000 |

* cited by examiner

*Primary Examiner*—Tan V. Mai
(74) *Attorney, Agent, or Firm*—Fitzpatrick, Cella, Harper & Scinto.

(57) ABSTRACT

A command for incrementing a numeric value is inputted by pressing a "2" key. A command for decrementing the numeric value is inputted by depressing an "8" key. At least one of a process for incrementing the numeric value by the amount of increment according to the length of time during which the "2" key is held down and a process for decrementing the numeric value by the amount of decrement according to the length of time during which the "8" key is held down is performed to determine a value to be input.

12 Claims, 7 Drawing Sheets

DATA INPUT APPARATUS AND METHOD

FIELD OF THE INVENTION

The present invention relates to a data input apparatus and data input method for inputting a desired numerical value.

BACKGROUND OF THE INVENTION

Various apparatus have been proposed for inputting a desired numerical value in computers or scrolling through a list of many display items that do not fit into a display panel to bring a desired hidden item into view.

For example, an input apparatus can be rolled with a finger of a user to scroll through the display items to bring a desired item into view from among hidden items or to perform other operations (see Japanese Patent Laid-Open No. 11-272378). This allows the user to flexibly control operations with the tactile sense of the finger or visual sense. Also, means for detecting the rotation speed and acceleration has been disclosed. Detected rotation speed and acceleration can be used to control the speed of scrolling without inputting an extremely large number of rotation angles.

Another apparatus has two buttons configured as personal identification number input means. An input numeric value is incremented according to how many times one of the buttons is pressed and how long the button is held down and the input value is confirmed by using the other button (see Japanese Patent Laid-Open No. 2000-207599).

These prior-art apparatuses displays data such as characters, words, sentences, address book data, phone numbers, indexes of audio and visual data, function items, and file names according to variation of speed and acceleration as well as rotation angle or the amount of rotation. However, the prior-art apparatuses have problems that such display does not allow visually impaired users to know which item is selected.

Furthermore, according to the prior art, an input numeric value can be incremented but cannot be decremented. This is inconvenient because if a user mistakenly enters a numeric value larger than intended, he or she cannot correct it or is required to start the input operation all over again.

The present invention has been made in view of these problems and an object of the present invention is to provide a data input apparatus and a data input method that allow a user to input numeric values in a simple and easy way.

SUMMARY OF THE INVENTION

In order to achieve the above object, for example, a data input apparatus of the present invention comprises the following arrangement.

That is, a data input apparatus for inputting a desired value, comprising:

first commanding means for inputting a command for incrementing a numeric value;

second commanding means for inputting a command for decrementing the numeric value;

first control means for controlling the amount of increment according to the length of time during which the first commanding means is uninterruptedly held;

second control means for controlling the amount of decrement according to the length of time during which the second commanding means is uninterruptedly held; and processing means for performing at least one of a process for incrementing the numeric value by the amount of increment controlled by the first control means and a process for decrementing the numeric value by the amount of decrement controlled by the second control means to determine the numeric value to be input.

In order to achieve the above object, for example, a data input method of the present invention comprises the following arrangement.

That is, a data input method for inputting a desired numeric value, comprising:

the first commanding step of inputting a command for incrementing a numeric value;

the second commanding step of inputting a command for decrementing the numeric value;

the first control step of controlling the amount of increment according to the length of time during which the command is being uninterruptedly inputted at the first commanding step;

the second control step of controlling the amount of decrement according to the length of time during which the command is being interruptedly inputted at the second commanding means; and the processing step of performing at least one of a process for incrementing the numeric value by the amount of increment controlled at the first control step and a process for decrementing the numeric value by the amount of decrement controlled at the second control step to determine the numeric value to be input.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Referring to the accompanying drawings, the present invention will be detailed below with respect to preferred embodiment of the present invention in which a data input apparatus of the present invention is applied to a photocopying machine.

[First Embodiment]

Figure 1:
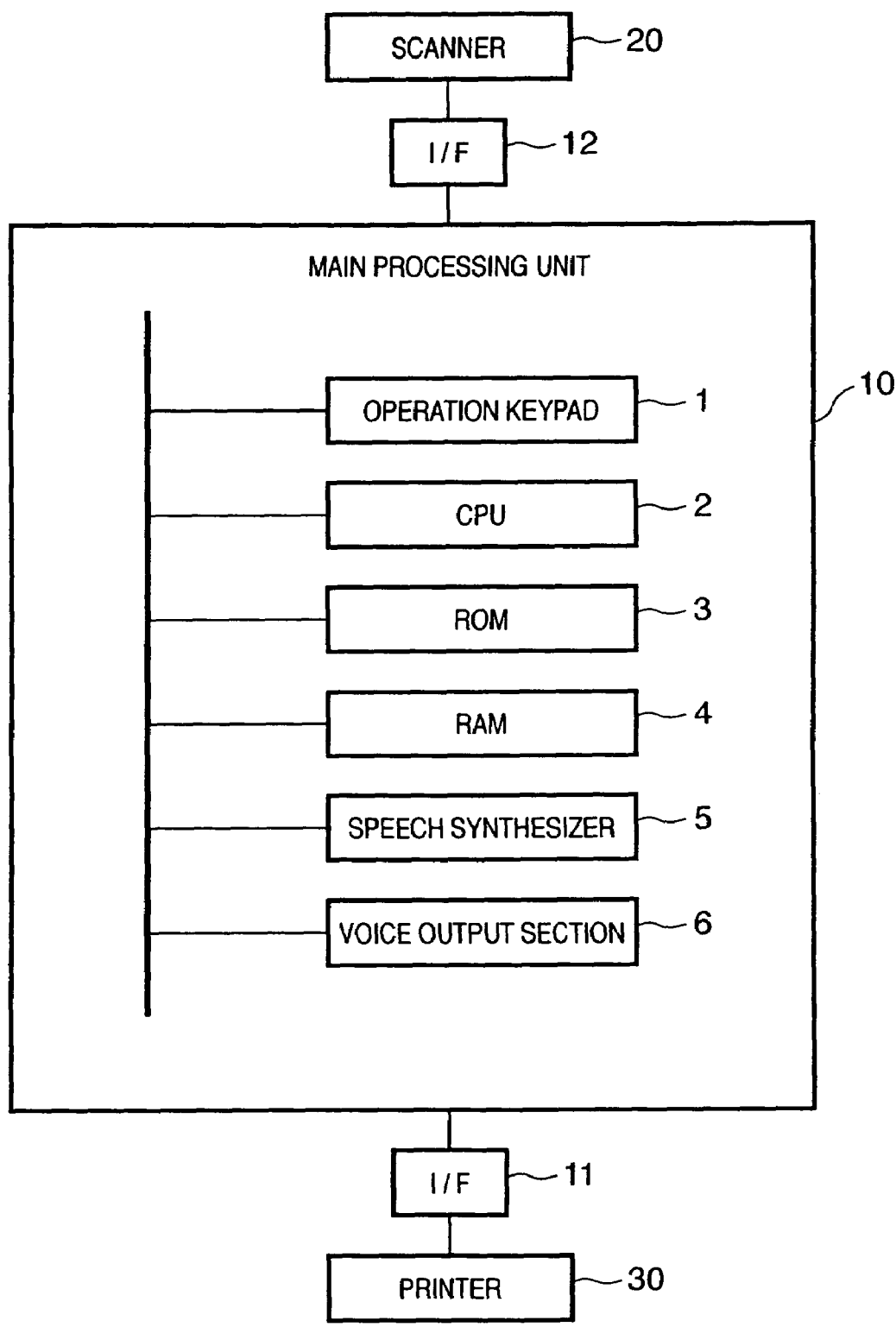
FIG. 1 shows a basic configuration of a photocopying machine according to a first embodiment of the present invention.

FIG. 1 shows a basic configuration of a photocopying machine according to a first embodiment. Roughly speaking, the basic configuration of the photocopying machine according to the present invention includes a main processing unit 10 that controls the entire apparatus and performs voice output processing, a scanner 20 that scans text and image on a recording medium such as paper, and a printer 30 that prints information scanned by the scanner 20 as images according to instructions from the main processing unit 10. The main processing unit 10 and the scanner 20 are interconnected through an interface 12 and can communicate data with each other. Similarly, the main unit 10 and the printer 30 are interconnected through an interface 11 and can communicate data with each other.

The main processing unit 10 will be described below. The main processing unit 10 comprises an operation keypad 1, a CPU 2, a ROM 3, a RAM 4, a speech synthesizer 5, and a voice output section 6. These components are connected onto a bus and can communicate data with each other.

The operation keypad 1 is used for entering various command into the CPU 2, which will be detailed later. The CPU 2 uses data held in the RAM 4 and programs stored in the ROM 3 to control the entire apparatus and also perform various processes, which will be described later. The CPU 2 contains a timer (not shown) having the capability of measuring time. The ROM 3 stores programs (for example a boot program) for controlling the entire apparatus, settings for the apparatus, and various items of voice data.

The RAM 4 is used for temporarily storing data to be processed by the CPU 2, and as is well known, readable and writable memory. The speech synthesizer 5 synthesizes speech based on speech data stored in ROM 3 and outputs the result of the speech synthesis to the voice output section 6. The speech synthesizer 5 includes a digital-analog converter and a speaker and outputs output voice according to the speech synthesis provided from the speech synthesizer 5. The voice output processing by the speech synthesizer 5 and voice output section 6 is a well-known technology and therefore the detailed description thereof will be omitted herein.

The scanner 20 and the printer 30 are not used in the following description and therefore the detailed description thereof will be omitted.

Figure 2:
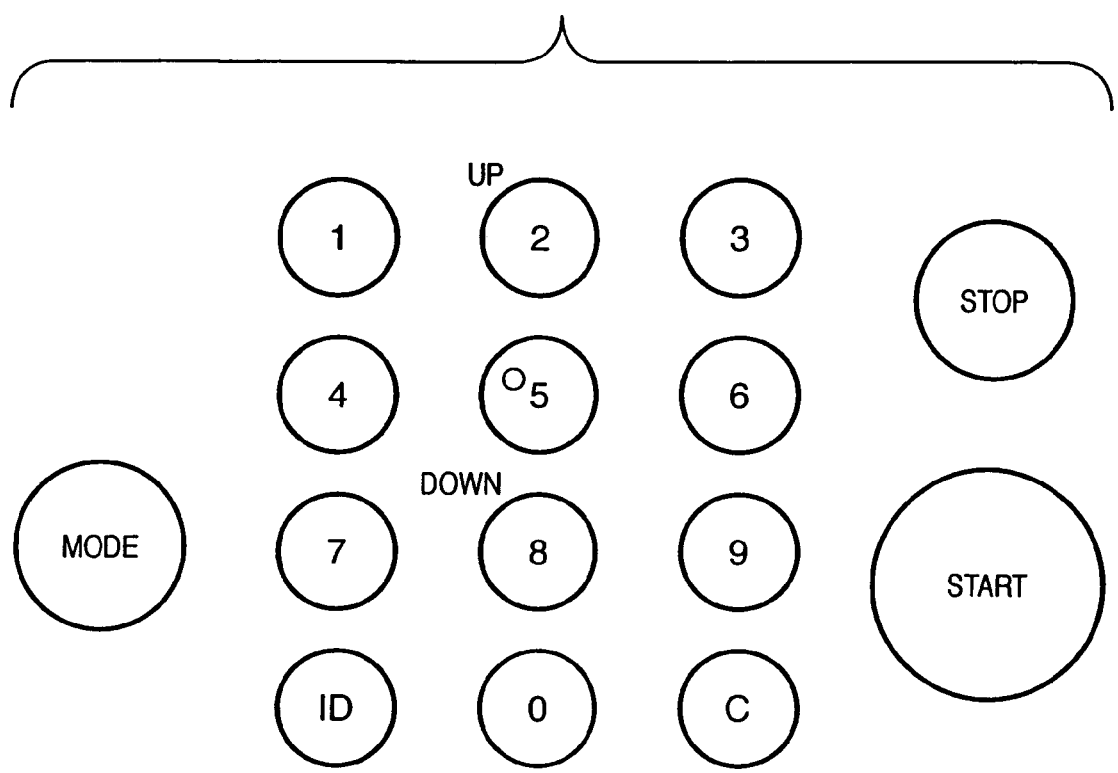
FIG. 2 shows an example of an arrangement of operation keypad 1.

FIG. 2 shows an example of a configuration of the operation keypad 1. The operation keypad 1 consists of numeric keys "0" to "9," an "ID" key, a clear (C) key, a mode button, a start button, and stop button. On the surface of the numeric key "5" is a raised portion so that a visually impaired user can know which key or button he or she is touching.

Actions described below are activated by depression of these keys and performed under the control of the CPU 2. That is, when the CPU 2 detects a depression of a key (details of which will be described below), the CPU 2 controls each component according to the pressed key and the conditions of the depression.

The photocopying machine according to the present embodiment has a normal mode and a mode for visually impaired user. In the mode for visually impaired user, the user is provided with voice output function that notifies the user of which item he or she just set, in addition to the functions provided in the normal mode. This allows the visually impaired user to know which item he or she has just set in the photocopying machine.

An operator of the photocopying machine can use the mode button to select a mode to use. Switching between the modes is made by pressing the mode button. Every time the mode button is pressed, switching is made between the normal mode and the visually impaired user mode. When the machine enters the normal mode, the voice output section 6 provides a voice output saying "Normal mode." When the system enters the visually impaired user mode, the voice output section 6 provides a voice output saying "Visually impaired user mode." These voice outputs are speech synthesis produced in the speech synthesizer 5 using audio data stored in the ROM 3.

An example in which the visually impaired user mode is selected will be described below. Operation of the photocopying machine in the normal mode is similar to the operation in the visually impaired user mode described below, except that the voice outputs are not provided in the normal mode.

When the visually impaired user mode is selected, the following voice message is provided: "To set paper size, press the 1 key. To set zoom, press the 4 key. To set single-sided print, press the 7 key. To set the number of copies, press the 2 key and the 8 key. To checks the settings, press the 5 key. If you want to raise the speed of voice, press the 3 key. If you want to lower the speed, press the 9 key." This voice message is speech synthesis produced in the speech synthesizer 5 using audio data stored in the ROM 3. It is assumed herein that the paper size is set to A4, the zoom is set to 100%, the single-/double-sided option is set for "single-sided copy from single-sided original," and the number of copies is set to 1, by default. These defaults are stored in the RAM 4.

Each time the 1 key is pressed, the paper size setting changes stepwise from A4 to A4 landscape, A3, B5, and A4. When the size is set to A4, the voice output section 6 provides a voice message, "The paper size has been set to A4." When it is changed to "A4 landscape," the voice output section 6 provides a voice message, "The paper size has been set to A4 landscape." In this way, every time a setting is changed, a voice message indicating the new setting is provided from the voice output section 6. The voice messages are speech synthesis produced in the speech synthesizer 5 using audio data stored in the ROM 3.

Each time the 4 key is pressed, the zoom changes stepwise from 100% to 86%, 81%, 70%, 50%, 115%, 122%, 141%, 200%, and 100%. When the zoom is set to 86%, the voice output section 6 provides a voice message, "The zoom has been set to 86%." When the zoom is changed to 81%, the voice output section 6 provides a voice message, "The zoom has been set to 81%." In this way, every time a setting is changed, a voice message indicating the new setting is provided from the voice output section 6. The voice messages are speech synthesis produced in the speech synthesizer 5 using audio data stored in the ROM 3.

Furthermore, each time the 7 key is pressed, the single-/double-sided copy option changes stepwise from "single-sided copy from single-sided original," "double-sided copy from single-sided original," "double-sided copy from double-sided original," "single-sided copy from double-sided original," and "single-sided copy from single-sided original." When the option is changed to "single-sided copy to single-sided copy," the voice output section 6 provides a voice message, "A single-sided copy will be made from a single-sided original." When the setting is changed to "double-sided copy from single sided-original," the voice output section 6 provides a voice message, "A double-sided copy will be made from a single-sided original." In this way, every time a setting is changed, a voice message indicating the new setting is provided from the voice output section 6. The voice messages are speech synthesis produced in the speech synthesizer 5 using audio data stored in the ROM 3.

The playback speed increases each time the 3 key is pressed. The playback speed decreases each time the 9 key is pressed. When the 6 key is pressed, the playback speed is reset to the default value. The control of the playback speed is accomplished by the CPU 2. The method for controlling the playback speed is well-known, the description of which will be omitted.

The method for setting the number of print copies will be describe below. The number of print copies can be set through the use of the 2 key and the 8 key. Pressing the 8 key increase the number of print copies. Pressing the 2 key decrease the number of print copies. The simple and easy way to set the number of print copies through the use of these keys will be described below.

Figure 3:
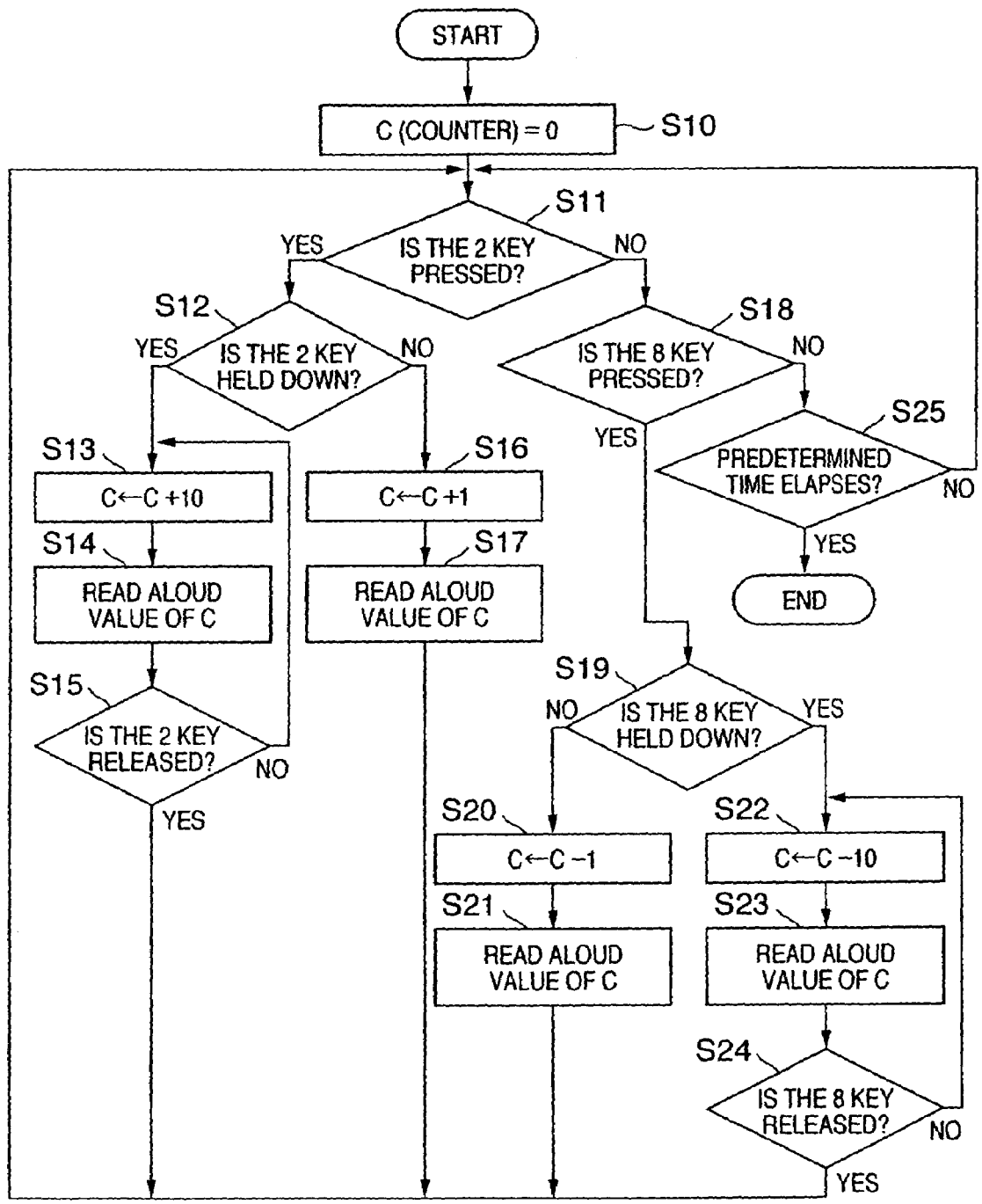
FIG. 3 shows a flowchart of a process performed by a CPU 2 for setting the number of copies to print.

FIG. 3 shows a flowchart of a process performed by the CPU 2 for setting the number of copies. First, a counter variable C indicating the number of print copies is initialized to 0 (step S10). When the CPU 2 detects a depression of the 2 key (step S11), the CPU 2 determines whether the 2 key is held down for a while, that is, held down for a predetermined length of time or longer (step S12). The detection is accomplished by the CPU 2 using its time measuring function to measure the length of time during which the 2 key is held down and compare the measured value with a threshold (predetermined length of time).

If the CPU 2 determines that the 2 key is held down for the predetermined length of time, the CPU 2 increments the counter variable C by 10 while the 2 key is held down (step S13). Every time the counter variable C is incremented, the voice output section 6 outputs the value of the counter variable C by voice (step S14). The voice is speech synthesis produced in the speech synthesizer 5 using audio data stored in the ROM 3. On the other hand, if the CPU 2 determines that the 2 key is released before the predetermined time elapses, the CPU 2 increments the counter variable C by 1 (step S16). Every time the counter variable C is incremented, the voice output section 6 outputs the value of the counter variable C (step S17). The voice is speech synthesis produced in the speech synthesize 5 using audio data stored in the ROM 3.

Thus, the increment for setting the number of copies can be controlled simply by using the 2 key with the process from step S12 to S17. Controlling the increment in this simple way is preferable for visually impaired users who find difficulty manipulating multiple keys.

On the other hand, if the CPU 2 does not detect a depression of the 2 key at step S11, the CPU 2 checks whether or not the 8 key is pressed (step S18). If the CPU 2 does not detect a depression of the 8 key, the CPU 2 measures the amount of time during which no depression of the 2 key and the 8 key. When a predetermined time elapses (step S25), this process ends.

If on the other hand the CPU 2 detects a depression of the 8 key at step S18, the CPU 2 determines whether or not the 8 key is held down for a predetermined length of time or longer (step S19). The CPU 2 makes the determination by using its timekeeping capability to measure the amount of time elapsed since the depression of the 8 key and comparing the measured time with a threshold (predetermined length of time).

If the CPU 2 determines that the 8 key is held down for the predetermined length of time or longer, the CPU 2 successively decrements the counter variable C by 10 while the 8 key is held down (step S22). Each time it is decremented, the voice output section 6 outputs the value of the counter variable C by voice (step S23). The voice is speech synthesis produced in the speech synthesizer 5 using audio data stored in the ROM 3. On the other hand, if the CPU 2 determines that the length of time during which key 8 is held down does not exceed the predetermined value, it successively decrements the counter variable C by 1 (step S20). Each time the counter variable C is decremented, the voice output section 6 outputs the value of the counter variable C by voice (step S21). The voice is speech synthesis produced in the speech synthesizer 5 using audio data stored in the ROM 3.

Thus, the decrement for setting the number of copies can be controlled simply by using the 8 key with the process from step S19 to S24. Controlling the decrement in this simple way is preferable for visually impaired users who find difficulty manipulating multiple keys.

Figure 4:
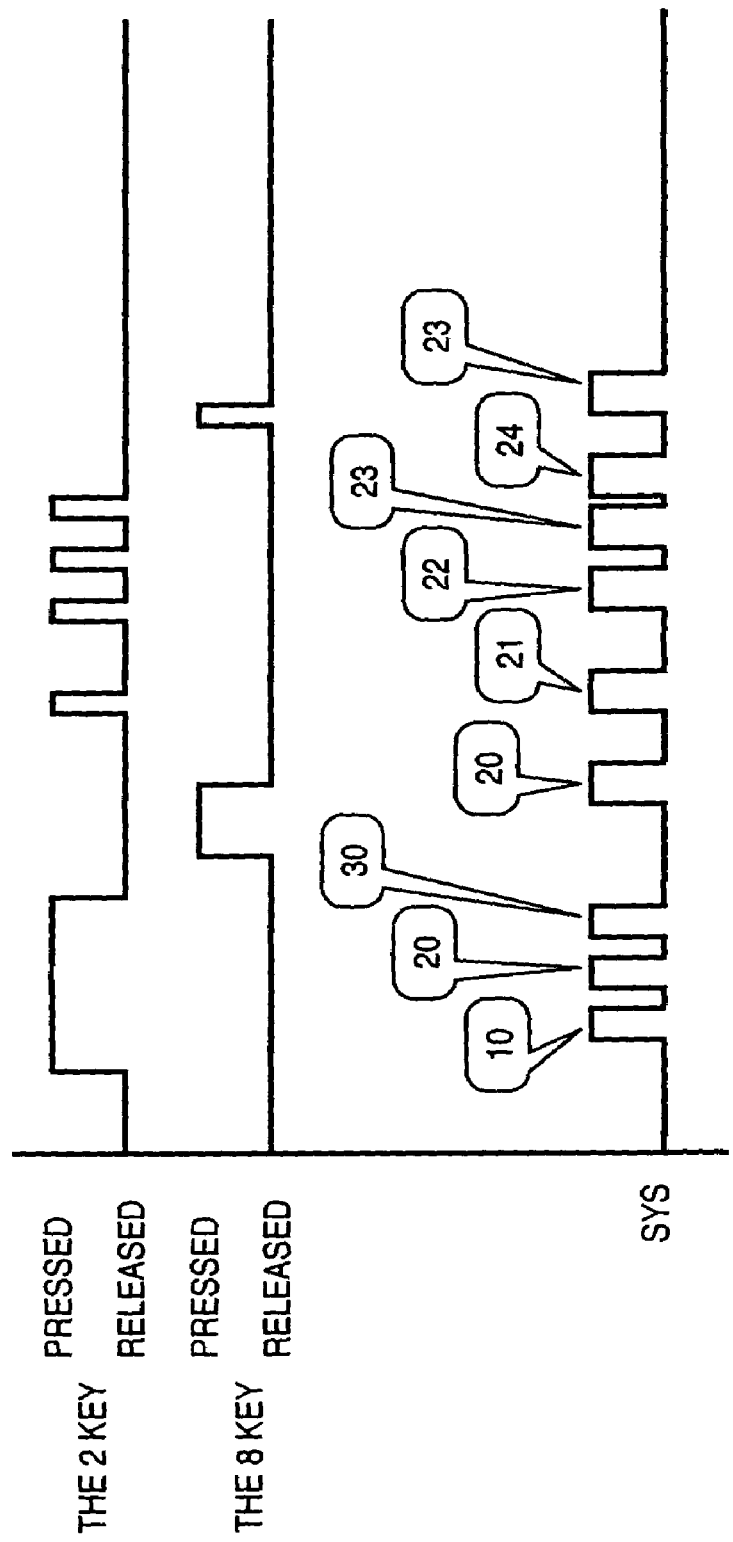
FIG. 4 shows a timing chart of timings of depression of the "2" and "8" keys and voice outputs.

FIG. 4 shows a timing chart of timings of depressions of the 2 key and the 8 key and voice outputs. In the example shown in this timing chart, the user is attempting to set the number of print copies to 23.

When the user press and hold the 2 key for a certain length of time, voice outputs, "ten", "twenty," and "thirty," are provided from the voice output section 6 at regular intervals (one second, for example). If the user releases the 2 key at this point of time and presses and holds the 8 key down for a certain length of time, a voice output, "twenty," is provided from the voice output section 6 at the regular intervals. Then, if the user presses the 2 key four times without holding it, voice outputs, "twenty-one," "twenty-two," "twenty-three," and "twenty-four," are provided at the regular intervals from the voice output section 6. Then, if the user presses the 8 key once without holding it, a voice output, "twenty-three," is provided from the voice output section 6 at the regular intervals. If the 2 key or the 8 key is pressed while a voice output is being provided, an interrupt by the CPU 2 occurs to discontinue the currently provided voice output and a voice output indicating a newly set number of copies is provided.

When the user presses the 5 key in order to check the settings he or she has just set, the voice output section 6 outputs a voice message, "Twenty-three print copies will be made on B4-size paper at a zoom of 100% in the single-sided copy from single-sided original mode. Is that all right?". The voice message is speech synthesis produced in the speech synthesizer 5 using audio data stored in the ROM 3. If the start button is pressed here, the scanner 20 and the printer 30 starts copying according to these settings under the control of the CPU 2.

The photocopying machine according to the present embodiment is advantageous for visually impaired user who find difficulty manipulating multiple keys, because the photocopying machine allows the users to increment or decrement the number of print copies in a simple and easy way as described above. In addition, the photocopying machine is also advantageous for visually impaired users because it can notify the user of the currently set number of copies by voice.

While in this embodiment the increment and decrement of input values according to the length of time for which a key is held down is used to set the number of print copies, the increment and decrement are not limited to this. They can be applied to other settings such as paper size, zoom, and single-/double-sided copy option, for example.

[Second Embodiment]

In the first embodiment, when the length of time for which the 2 key or the 8 key is held down exceeds a predetermined length, the rate at which increments or decrements are performed is fixed regardless of key depression time. That is, a value is incremented or decremented at fixed time intervals. In a photocopying machine according to a second embodiment in contrast, the rate at which increments or decrements are performed are increased according to the length of time for which the 2 key/the 8 key is held down. That is, the time interval between increments or decrements is reduced as the 2 key/the 8 key depression time becomes long.

Figure 5:
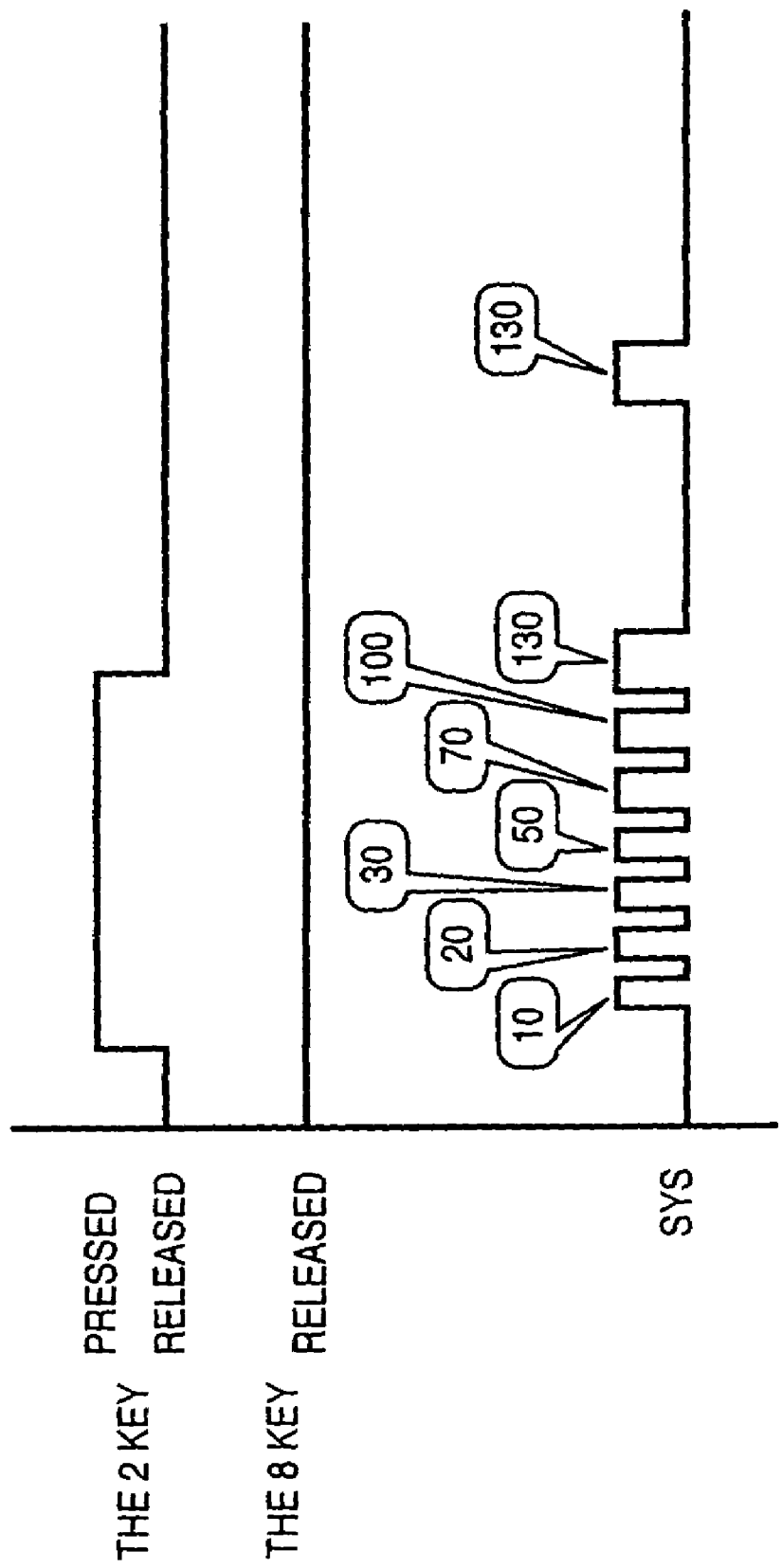
FIG. 5 shows a timing chart of timings of voice outputs while the "2" key is being held down in a photocopying machine according to a second embodiment of the present invention.

FIG. 5 is a timing chart showing timings of voice outputs provided when the 2 key is held down in the photocopying machine according to the second embodiment. When the increment/decrement rate is increased, the set number of print copies could change to the next value before reading aloud of the current number of copies is completed, because the speed of playback of voice indicating the number of copies is unchanged even though the increment/decrement rate is raised.

Therefore, rather than constantly counting up/down the number of copies by voice, the interval between countups/countdowns by voice is increased as the increment/decrement rate is raised in the second embodiment. In particular, the number of copies set after a predetermined length of time (for example 1 second) is elapsed since the end of the current reading out of the number of copies is read aloud.

For example, in FIG. 5, when the 2 key (UP) is held down for a certain length of time, the number of copies is read aloud as follows: "ten," "twenty," "thirty," "fifty," "seventy," and "one hundred," and "one hundred thirty." If the 2 key is not pressed in a certain length of time (for example 5 seconds) after it is released, the currently set number of copies, "one hundred thirty," is read aloud.

The interval between countups/countdowns by voice according to the increment/decrement rate is stored in a ROM 3 as table data.

While the example has been described in which the 2 key is held down for a certain length of time, the 8 key operates in a similar manner when it is held down.

While the playback speed is constant in the example described above, the playback speed may be increased as key depression time increases.

The user can increase the reading speed by pressing the 3 key. The playback speed may be increased as the reading speed is increased by the user.

[Third Embodiment]

The photocopying machine according to the second embodiment allows a greater numeric value to be specified faster according to the length of key depression, which is convenient for specifying a large number of copies. However, the photocopying machine of the second embodiment can be inconvenient for entering an intended value precisely. That is, when the length of depression time exceeds a certain value, the set number of copies changes faster and therefore a value smaller or greater than intended could be set, depending on the reflexes of an operator.

Therefore, a photocopying machine according to a third embodiment uses, in addition to key operations, speech recognition technology to correct an error between an intended number of copy and a set value that is caused by a key operation.

Figure 6:
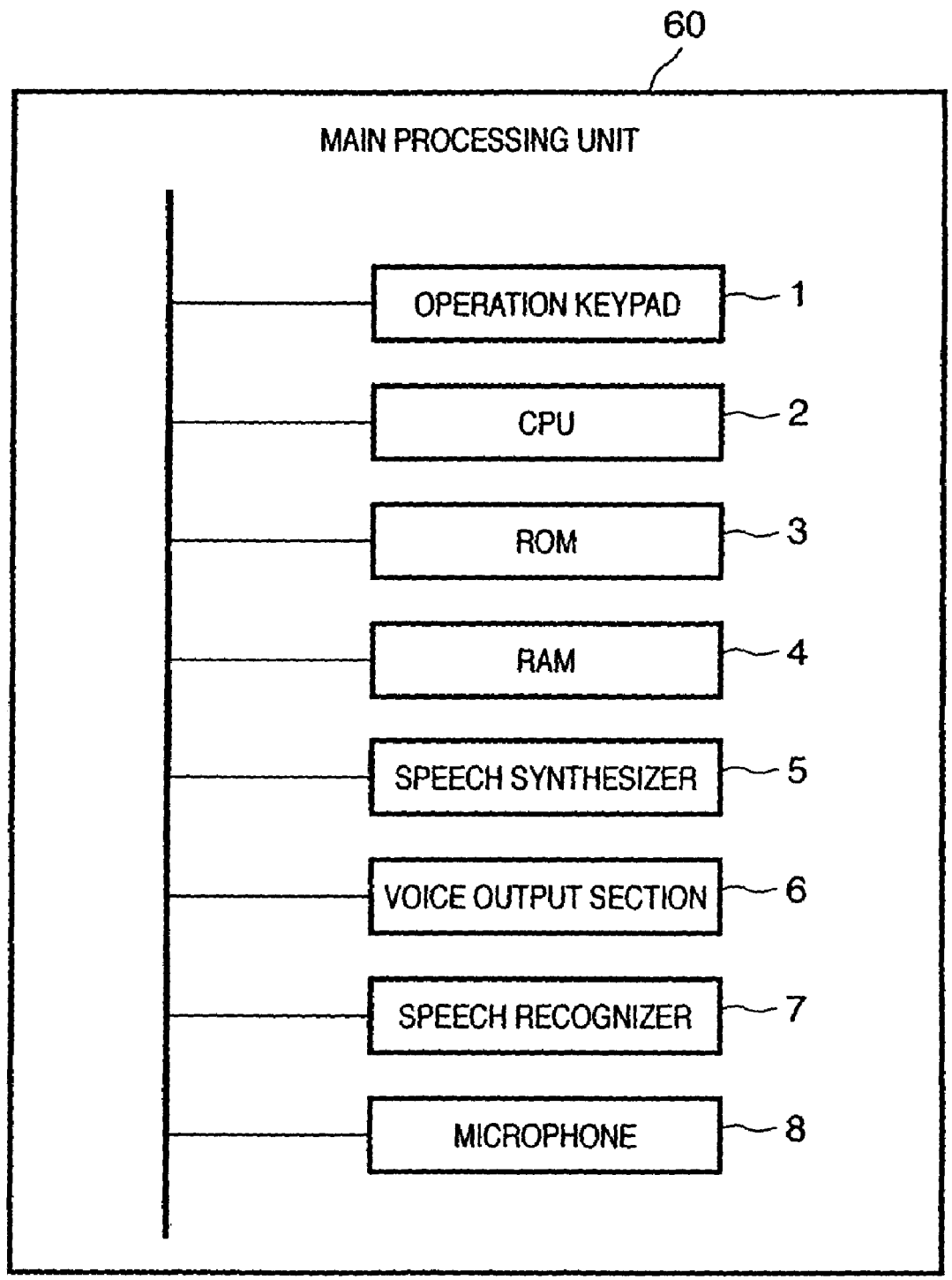
FIG. 6 shows a basic configuration of the main processing unit of a photocopying machine according to a third embodiment of the present invention.

FIG. 6 shows a basic configuration of the main processing unit of the photocopying machine according to the third embodiment. In FIG. 6, the same parts as those in FIG. 1 are indicated by the same reference numbers.

The main processing unit shown in FIG. 6 comprises a speech recognizer 7 and a microphone 8 in addition to the components of the main processing unit shown in FIG. 1.

The speech recognizer 7 has a recognizable vocabulary including numbers ranging from 1 to a predetermined number (for example 10000) and words such as "yes" and "no" that express affirmation and negation and uses such recognizable vocabulary to perform speech recognition of voice inputted through the microphone 8, which functions as an input interface for inputting voice.

Like the photocopying machine according to the second embodiment, the photocopying machine according to the third invention allows a user to use the 2 key and the 8 key to set the number of print copies. However, in the photocopying machine of the third invention, voice input is used together with the key entry, first the keys are used to enter an approximate value of an intended number of copies. Then the intended number of copies is entered by voice through the microphone 8 (the user dictates the intended number of copies into the microphone 8) and the speech recognizer 7 performs speech recognition on the inputted voice by using values near the value entered through the keys as recognizable words and sets he value it recognized as the value intended by the user.

Figure 7:
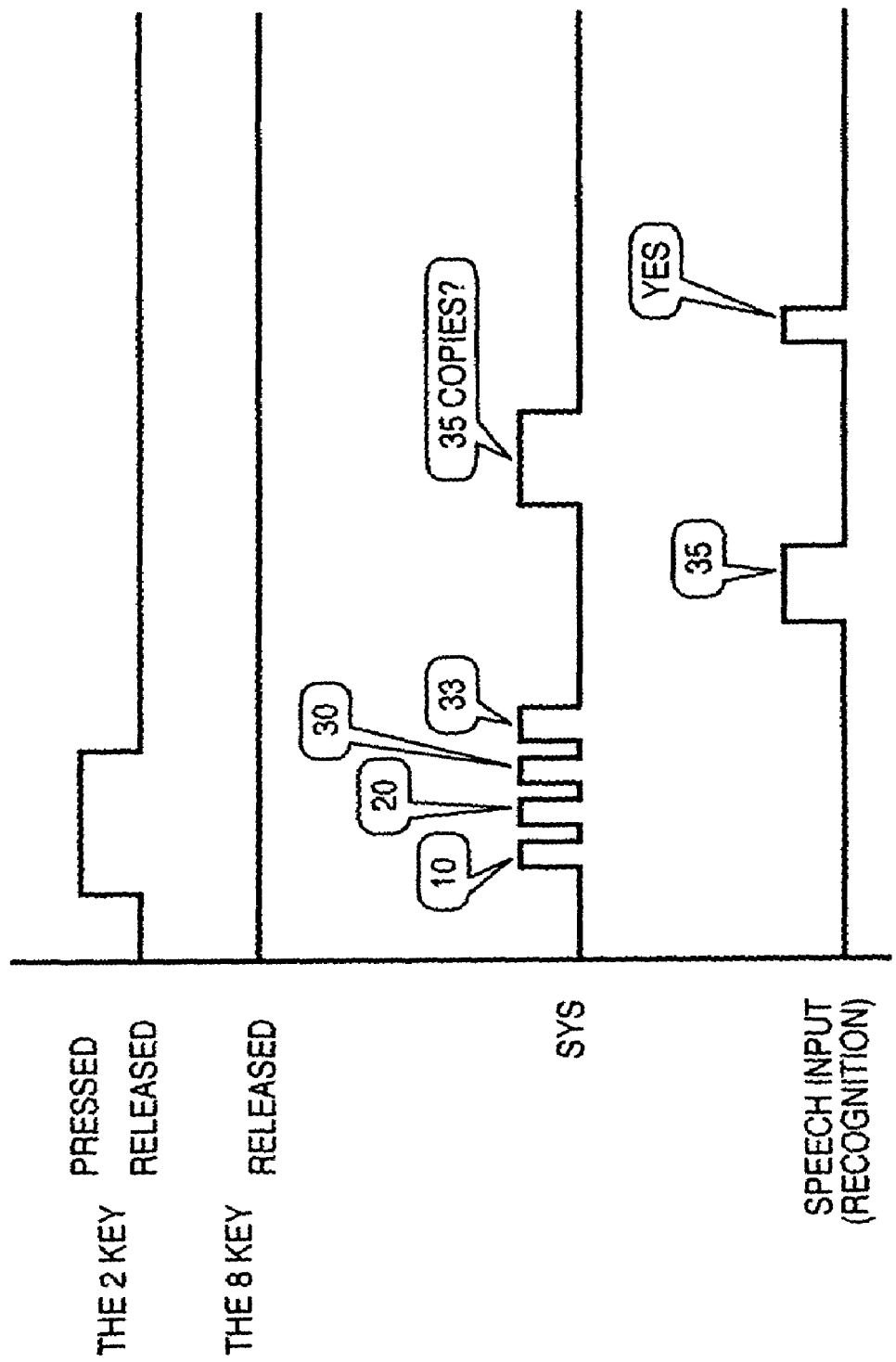
FIG. 7 shows a timing chart of timings of voice outputs and speech recognition while the "2" key is being held down in a photocopying machine according to the third embodiment of the present invention.

FIG. 7 is a timing chart showing the timings of voice outputs caused by holding the 2 key and the timings of speech recognition in the photocopying machine according to the third embodiment. While the 2 key is held down to enter a numeric value of 33 in FIG. 7, the method for entering the value 33 is not limited to this. The value may be entered by pressing the 2 key more than once without holding it, or by pressing the 2 key a number of times and holding it, or using the 8 key in a similar manner. The intended number of copies in this example is assumed to be 35. Whichever method is used to enter the value 33, a voice output indicating the number copies is provided from a voice output section 6 each time it is set.

When the value 33 is entered by using any of the methods described above, the value must be corrected to 35. As described above, the recognizable vocabulary of the speech recognizer 7 includes the numbers from 1 to a predetermined number. When the value 33 is entered by using a key, the speech recognizer assumes N numeric values around this value as recognizable words that it should actually use. If N=2, the recognizable words are the following five words: "thirty-one," "thirty-two, "thirty-three," "thirty-four," and "thirty-five." The words that should be actually used are not necessarily limited to these. For example, numeric values ranging from value M (33 in this example) to (M+N) may be used as recognizable words.

When a user inputs the word "thirty-five" by voice through the microphone 8, the speech recognizer 7 analyzes the inputted voice and searches through the recognizable words for a matching one. If the speech recognizer 7 determines that there is no match and performs no process. On the other hand, if the speech recognizer 7 recognizes that the inputted speech matches the recognizable word "thirty-five," it outputs a voice message, "The number of copies is 35?" through the voice output section 6. Then, if the inputs "Yes" by voice through the microphone 8, the speech recognizer 7 analyzes the voice to determine whether it is the recognizable word "yes" or "no."

If the speech recognizer 7 recognizes the voice as "yes," the counter variable C described earlier is set to 35 and a voice output, "thirty-five," is outputted from the voice output section 6.

The value of N can be set by using the 0 key. Each time the 0 key is pressed, the value of N changes from 1 to 2, 3, . . . 30 to 1. Each time the value of N changes, the value of N is outputted by voice from the voice output section 6.

[Fourth Embodiment]

The method of specifying a numeric value is not limited to the one described in the embodiments described above. The method of specifying a numeric value in a fourth embodiment is different from those in the above-described embodiments in that numeric keys 1 to 9 are used to enter the value.

As the length of time for which the 1 key is held down increases, the numeric value to be specified changes from 1 to 10 to 100 and so on, for example. As the length of time for which the 2 key is held down increases, the numeric value to be specified changes from 2 to 20 to 200 and so on. That is, the numeric value to be specified increases from a number of a key by an order of magnitude at predetermined intervals. Each time the numeric value to be specified changes, the value that is being specified is output by voice from the voice output section 6. When the user release the key, the value specified at that point of time is set as the number of copies.

For example, if the intended number of copies is 215, the user presses and holds the 2 key and listens to the voice outputted from the voice output section 6. When the number "two hundred" is spoken, the user releases the key. Then, the user presses and holds the 1 key and listens to the voice outputted from the voice output section 6. When the number "ten" is spoken, the user releases the 1 key. Finally, the user presses and holds the 5 key, when the number "five" is spoken, the user releases the 5 key. In this way, the user can specify the number of copies.

[Fifth Embodiment]

While numbers are read aloud in Japanese in the embodiments described above, they may be read aloud in English or any other languages.

[Sixth Embodiment]

While the data input apparatus of the present invention is applied to a photocopying machine in the embodiment described above, the present invention is not limited to this. For example, the data input apparatus of the present invention may be applied to other devices such as a facsimile, a hand-held terminals, an ATM that include an input apparatus for inputting numeric values.

[Seventh Embodiment]

The keys and buttons in the above-described embodiments may be implemented by GUI buttons displayed on a touch panel. Visually impaired users cannot know which button on a touch panel he or she is pressing with the sense of touch. Voice feedback can greatly help visually impaired users to enter such GUI buttons.

[Other Embodiment]

The present invention is not limited to an apparatus and method that implement the embodiments described above. Also included in the scope of the present invention is the case where a software program code for implementing any of the embodiments is supplied to a computer (CPU or MPU) in a system or apparatus such as those described above to cause the system or the apparatus to operate those devices described above according to the program code so that the embodiment is implemented.

In this case, the software program code itself implements the features of the embodiment and therefore the program code itself and means for supplying the program code to the computer, in particular a storage medium containing the program code, is included in the scope of the present invention.

The storage medium storing the program code may be a floppy® disk, hard disk, optical disk, magneto-optical disk, CD-ROM, magnetic tape, nonvolatile memory card, or ROM.

Not only the case where the computer controls devices according to the supplied program code alone to implement the embodiment but also the case where the program code cooperates with an OS (operating system) or other application software running on the computer to implement the embodiment as well as the program code itself is also included in the scope of the present invention.

Furthermore, also included in the scope of the present invention is the case where, after the supplied program code is loaded into a memory contained in an expansion board of a computer or an expansion unit connected to the computer, a CPU provided on the expansion board or the expansion unit performs part or all of actual processing according to the instruction of the program code and the processing implements the embodiment.

As apparent from the foregoing description, the present invention enables simple entry of numeric values.

The present invention is not limited to the above embodiment and various changes and modifications can be made within the spirit and scope of the present invention. Therefore, to apprise the public of the scope of the present invention the following claims are made.

What is claimed is:

1. A data input apparatus for inputting a desired value, comprising:

first commanding means for inputting a command for incrementing a numeric value;

second commanding means for inputting a command for decrementing the numeric value;

first control means for controlling the amount of increment according to the length of time during which said first commanding means is uninterruptedly held;

second control means for controlling the amount of decrement according to the length of time during which said second commanding means is uninterruptedly held;

processing means for performing at least one of a process for incrementing the numeric value by the amount of increment controlled by said first control means and a process for decrementing the numeric value by the amount of decrement controlled by said second control means to determine the numeric value to be input;

voice input means for inputting voice; and speech recognition means for performing speech recognition of inputted voice, wherein said speech recognition means recognizes the inputted voice by using, as recognizable words, numeric values near a value to which a process by said processing means is applied and, if a recognized numeric value matches any of said recognizable words, said processing means determines the numeric value corresponding to the matching word as a numeric value to be inputted.

2. The data input apparatus according to claim 1, wherein said processing means increases the speed of increment according to the length of time during which said first commanding means is uninterruptedly held and increases the speed of decrement according to the length of time during which said second commanding means is uninterruptedly held.

3. The data input apparatus according to claim 1, wherein said first control means sets the amount of increment to a first amount if the length of time during which said first commanding means is uninterruptedly held is shorter than a predetermined length of time or sets the amount of increment to a second amount larger than the first amount if said length of time is equal to or longer than said predetermined length of time.

4. The data input apparatus according to claim 1, wherein said second control means sets the amount of decrement to a first amount if the length of time during which said second commanding means is uninterruptedly held is shorter than a predetermined length of time or sets the amount of decrement to a second amount larger than the first amount if said length of time is equal to or longer than said predetermined length of time.

5. A data input apparatus for inputting a desired value, comprising:
   first commanding means for inputting a command for incrementing a numeric value;
   second commanding means for inputting a command for decrementing the numeric value;
   first control means for controlling the amount of increment according to the length of time during which said first commanding means is uninterruptedly held;
   second control means for controlling the amount of decrement according to the length of time during which said second commanding means is uninterruptedly held;
   processing means for performing at least one of a process for incrementing the numeric value by the amount of increment controlled by said first control means and a process for decrementing the numeric value by the amount of decrement controlled by said second control means to determine the numeric value to be input; and
   voice output means for outputting, as a voice, the numeric value as a result of at least one of the process for incrementing the numeric value or the process for decrementing the numeric value that is performed by said processing means.

6. A data input method for inputting a desired numeric value, comprising:
   the first commanding step of inputting a command for incrementing a numeric value;
   the second commanding step of inputting a command for decrementing the numeric value;
   the first control step of controlling the amount of increment according to the length of time during which the command is being uninterruptedly inputted at said first commanding step;
   the second control step of controlling the amount of decrement according to the length of time during which the command is being interruptedly inputted at said second commanding step;
   the processing step of performing at least one of a process for incrementing the numeric value by the amount of increment controlled at said first control step and a process for decrementing the numeric value by the amount of decrement controlled at said second control step to determine the numeric value to be input;
   the voice input step of inputting voice; and
   the speech recognition step of performing speech recognition of inputted voice,
   wherein, at said speech recognition step, the inputted voice is recognized by using, as recognizable words, numeric values near a value to which a process at said processing step is applied and, if a recognized numeric value matches any of said recognizable words, the numeric value corresponding to the matching word is determined at said processing step as a numeric value to be inputted.

7. The data input method according to claim 6, wherein, at said processing step, the speed of increment is increased according to the length of time during which the command is being uninterruptedly inputted at said first commanding step and increases the speed of decrement according to the length of time during which the command is being uninterruptedly inputted at said second commanding step.

8. The data input method according to claim 6, wherein, at said first control step, the amount of increment is set to a first amount if the length of time during which the command is uninterruptedly inputted at said first commanding step is shorter than a predetermined length of time or the amount of increment is set to a second amount larger than the first amount if said length of time is equal to or longer than said predetermined length of time.

9. The data input method according to claim 6, wherein, at said second control step, the amount of decrement is set to a first amount if the length of time during which the command is being uninterruptedly inputted at said second commanding step is shorter than a predetermined length of time or the amount of decrement is set to a second amount larger than the first amount if said length of time is equal to or longer than said predetermined length of time.

10. A computer-readable storage medium storing a computer program for causing a computer to perform the data input method according to claim 6.

11. A data input method for inputting a desired numeric value, comprising:
   the first commanding step of inputting a command for incrementing a numeric value;
   the second commanding step of inputting a command for decrementing the numeric value;
   the first control step of controlling the amount of increment according to the length of time during which the command is being uninterruptedly inputted at said first commanding step;
   the second control step of controlling the amount of decrement according to the length of time during which the command is being interruptedly inputted at said second commanding step;
   the processing step of performing at least one of a process for incrementing the numeric value by the amount of increment controlled at said first control step and a process for decrementing the numeric value by the amount of decrement controlled at said second control step to determine the numeric value to be input; and
   the voice output step of outputting, as a voice, the numeric value as a result of at least one of the process for incrementing the numeric value or the process for decrementing the numeric value that is performed at said processing step.

12. A computer-readable storage medium storing a computer program for causing a computer to perform the data input method according to claim 11.

* * * * *